United States Patent
Young et al.

(10) Patent No.: US 11,063,671 B2
(45) Date of Patent: *Jul. 13, 2021

(54) METHOD AND SYSTEM FOR REDUNDANT LIGHT SOURCES BY UTILIZING TWO INPUTS OF AN INTEGRATED MODULATOR

(71) Applicant: Luxtera LLC, Carslbad, CA (US)

(72) Inventors: Greg Young, Irvine, CA (US); Peter DeDobbelaere, San Diego, CA (US)

(73) Assignee: Luxtera LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/789,792

(22) Filed: Feb. 13, 2020

(65) Prior Publication Data

US 2020/0186252 A1 Jun. 11, 2020

Related U.S. Application Data

(63) Continuation of application No. 16/430,679, filed on Jun. 4, 2019, now Pat. No. 10,567,086, which is a (Continued)

(51) Int. Cl.
*G02F 1/00* (2006.01)
*H04B 10/54* (2013.01)
(Continued)

(52) U.S. Cl.
CPC ......... *H04B 10/541* (2013.01); *H04B 10/032* (2013.01); *H04B 10/503* (2013.01); *H04B 10/505* (2013.01); *G02F 1/212* (2021.01)

(58) Field of Classification Search
CPC .. H04B 10/541; H04B 10/032; H04B 10/038; H04B 10/516; H04B 10/035;
(Continued)

(56) References Cited

U.S. PATENT DOCUMENTS 5,710,653 A 1/1998 Nemecek
7,447,446 B2 11/2008 Aoki
(Continued)

FOREIGN PATENT DOCUMENTS

JP 2002169131 A 6/2002

OTHER PUBLICATIONS

PCT International Search Report for International Application No. PCT/US2017/040332.

*Primary Examiner* — Hanh Phan
(74) *Attorney, Agent, or Firm* — Patterson + Sheridan, LLP (57) ABSTRACT

Methods and systems for redundant light sources by utilizing two inputs of an integrated modulator are disclosed and may include: an optoelectronic transmitter with first and second laser sources for providing optical signals to the transmitter, the transmitter comprising an optical modulator with a first input waveguide coupled to the first laser source and second input waveguide coupled to the second laser source, the optoelectronic receiver being operable to: configure the first laser source to provide an optical signal to the first input of the optical modulator; and if the first laser source does not provide an optical signal, configure the second laser source to provide an optical signal to the second input of the optical modulator. The first laser source may be optically coupled to the first input waveguide and the second laser source optically coupled to the second input waveguide using grating couplers.

20 Claims, 6 Drawing Sheets

Related U.S. Application Data continuation of application No. 15/639,515, filed on Jun. 30, 2017, now Pat. No. 10,313,019.

(60) Provisional application No. 62/357,715, filed on Jul. 1, 2016.

(51) Int. Cl.
  *H04B 10/032* (2013.01)
  *H04B 10/50* (2013.01)
  *G02F 1/21* (2006.01)

(58) Field of Classification Search
  CPC .. H04B 10/503; H04B 10/506; H04B 10/505; H04Q 11/0003; H04Q 11/0005
  USPC ........ 398/2, 3, 4, 5, 7, 8, 10, 13, 17, 33, 38, 398/79, 135, 136, 45, 48, 158, 159, 22, 398/23, 24, 182, 183, 188; 385/1, 2, 3, 385/14, 39, 24; 359/245, 247, 248, 237, 359/238, 254
  See application file for complete search history.

(56) References Cited

U.S. PATENT DOCUMENTS

| | | | |
|---|---|---|---|
| 10,313,019 B2* | 6/2019 | Young | H04B 10/503 |
| 10,567,086 B2* | 2/2020 | Young | H04B 10/505 |
| 2012/0243820 A1 | 9/2012 | Hayakawa | |
| 2013/0183041 A1 | 7/2013 | Wan et al. | |
| 2014/0321848 A1 | 10/2014 | Sekiguchi | |
| 2015/0381277 A1* | 12/2015 | Shimizu | H04B 10/079 398/34 |
| 2016/0112118 A1* | 4/2016 | Rahn | H04B 10/506 398/5 |
| 2017/0111716 A1 | 4/2017 | Wellbrock | |

* cited by examiner

METHOD AND SYSTEM FOR REDUNDANT LIGHT SOURCES BY UTILIZING TWO INPUTS OF AN INTEGRATED MODULATOR

CROSS-REFERENCE TO RELATED APPLICATIONS/INCORPORATION BY REFERENCE

This application is a continuation of U.S. application Ser. No. 16/430,679 filed on Jun. 4, 2019, now U.S. Pat. No. 10,567,086, which is a continuation of U.S. application Ser. No. 15/639,515 filed on Jun. 30, 2017, now U.S. Pat. No. 10,313,019, which claims priority to and the benefit of U.S. Provisional Application 62/357,715 filed on Jul. 1, 2016, which is hereby incorporated herein by reference in its entirety.

FIELD

Certain embodiments of the disclosure relate to semiconductor photonics. More specifically, certain embodiments of the disclosure relate to a method and system for redundant light sources by utilizing two inputs of an integrated modulator.

BACKGROUND

As data networks scale to meet ever-increasing bandwidth requirements, the shortcomings of copper data channels are becoming apparent. Signal attenuation and crosstalk due to radiated electromagnetic energy are the main impediments encountered by designers of such systems. They can be mitigated to some extent with equalization, coding, and shielding, but these techniques require considerable power, complexity, and cable bulk penalties while offering only modest improvements in reach and very limited scalability. Free of such channel limitations, optical communication has been recognized as the successor to copper links.

Further limitations and disadvantages of conventional and traditional approaches will become apparent to one of skill in the art, through comparison of such systems with the present disclosure as set forth in the remainder of the present application with reference to the drawings.

BRIEF SUMMARY

A system and/or method for redundant light sources by utilizing two inputs of an integrated modulator, substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry or a device is "operable" to perform a function whenever the circuitry or device comprises the necessary hardware and code (if any is necessary) to perform the function, regardless of whether performance of the function is disabled or not enabled (e.g., by a user-configurable setting, factory trim, etc.).

Figure 1A:
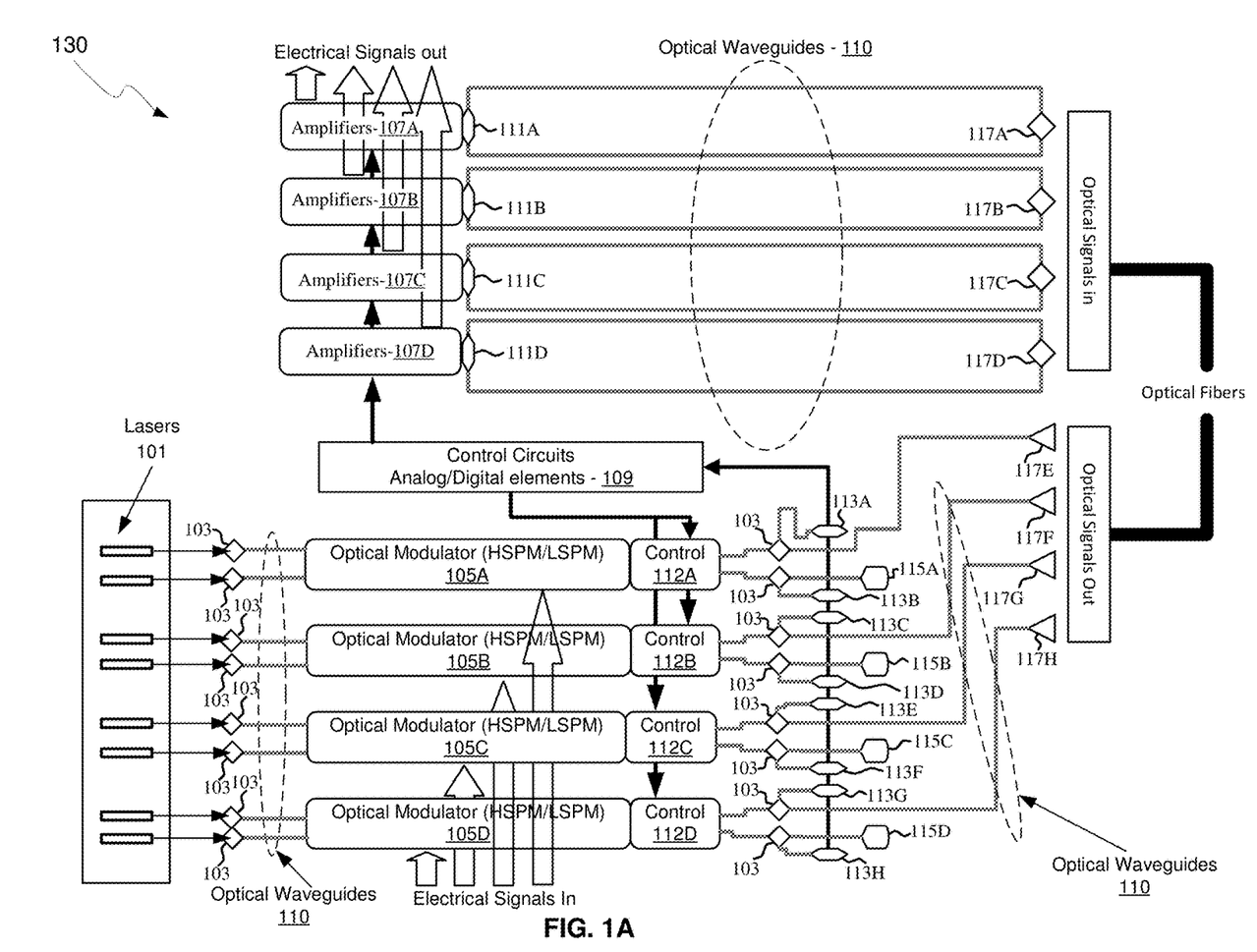
FIG. 1A is a block diagram of a photonically-enabled integrated circuit with redundant light sources utilizing two inputs of an integrated modulator, in accordance with an example embodiment of the disclosure.

FIG. 1A is a block diagram of a photonically-enabled integrated circuit with redundant light sources utilizing two inputs of an integrated modulator, in accordance with an example embodiment of the disclosure. Referring to FIG. 1A, there is shown optoelectronic devices on a photonically-enabled integrated circuit 130 comprising lasers 101, optical modulators 105A-105D, photodetectors 111A-111D, monitor photodetectors 113A-113H, and optical devices comprising couplers 103, optical terminations 115A-115D, and grating couplers 117A-117H. There are also shown electrical devices and circuits comprising amplifiers 107A-107D, analog and digital control circuits 109, and control sections 112A-112D. The amplifiers 107A-107D may comprise transimpedance and limiting amplifiers (TIA/LAs), for example.

In an example scenario, the photonically-enabled integrated circuit 130 comprises a CMOS photonics die with lasers 101 coupled to the top surface of the IC 130. The lasers 101 comprise a plurality of semiconductor lasers with isolators, lenses, and/or rotators for directing one or more CW optical signals to the couplers 103. The photonically enabled integrated circuit 130 may comprise a single chip, or may be integrated on a plurality of die, such as one or more electronics die and one or more photonics die.

Optical signals are communicated between optical and optoelectronic devices via optical waveguides 110 fabricated in the photonically-enabled integrated circuit 130.

Single-mode or multi-mode waveguides may be used in photonic integrated circuits. Single-mode operation enables direct connection to optical signal processing and networking elements. The term "single-mode" may be used for waveguides that support a single mode for each of the two polarizations, transverse-electric (TE) and transverse-magnetic (TM), or for waveguides that are truly single mode and only support one mode whose polarization is TE, which comprises an electric field parallel to the substrate supporting the waveguides. Two typical waveguide cross-sections that are utilized comprise strip waveguides and rib waveguides. Strip waveguides typically comprise a rectangular cross-section, whereas rib waveguides comprise a rib section on top of a waveguide slab. Of course, other waveguide cross section types are also contemplated and within the scope of the disclosure.

In an example scenario, the couplers 103 may comprise low-loss Y-junction power splitters where couplers 103 receive optical signals from the lasers 101 and split the signals to two branches that direct the optical signals to the modulators 105A-105D.

The optical power splitter may comprise at least one input waveguide and at least two output waveguides. Some of the couplers 103 shown in FIG. 1A illustrate 1-by-2 splitters, which divide the optical power in one waveguide into two other waveguides evenly. These Y-junction splitters may be used in multiple locations in an optoelectronic system, such as in a Mach-Zehnder interferometer (MZI) modulator, e.g., the optical modulators 105A-105D, where a splitter and a combiner are needed, since a power combiner can be a splitter used in reverse.

In another example scenario, the Y-junction may be utilized in a parallel multi-channel transmitter, where a cascade of 1-by-2 splitters can be employed to have a single light source feed multiple channels. Interleaver-based multiplexers and demultiplexers constitute a third example where 1-by-2 splitters are among the building blocks.

In an example embodiment, the photodetectors 111A-111D and monitor photodetectors 113A-113H may comprise photodiodes, such as PN or PIN junctions, although other detector types may be utilized, such as photoconductors, MSM photodetectors, or avalanche photodiodes, for example.

The optical modulators 105A-105D comprise Mach-Zehnder or ring modulators, for example, and enable the modulation of continuous-wave (CW) laser input signals. The optical modulators 105A-105D may comprise high-speed and low-speed phase modulation sections and are controlled by the control sections 112A-112D. The high-speed phase modulation section of the optical modulators 105A-105D may modulate a CW light source signal with a data signal. The low-speed phase modulation section of the optical modulators 105A-105D may compensate for slowly varying phase factors such as those induced by mismatch between the waveguides, waveguide temperature, or waveguide stress and is referred to as the passive phase, or the passive biasing of the MZI.

In an example scenario, the high-speed optical phase modulators may operate based on the free carrier dispersion effect and may demonstrate a high overlap between the free carrier modulation region and the optical mode. High-speed phase modulation of an optical mode propagating in a waveguide is the building block of several types of signal encoding used for high data rate optical communications. Speed in the several Gb/s may be required to sustain the high data rates used in modern optical links and can be achieved in integrated Si photonics by modulating the depletion region of a PN junction placed across the waveguide carrying the optical beam. In order to increase the modulation efficiency and minimize the loss, the overlap between the optical mode and the depletion region of the PN junction is optimized.

The outputs of the optical modulators 105A-105D may be optically coupled via the waveguides 110 to the grating couplers 117E-117H. The couplers 103 at the outputs of the optical modulators 105A-105D may comprise four-port optical couplers, for example, and may be utilized to sample or split the optical signals generated by the optical modulators 105A-105D, with the sampled signals being measured by the monitor photodetectors 113A-113H. The unused branches of the directional couplers 103 may be terminated by optical terminations 115A-115D to avoid back reflections of unwanted signals.

The grating couplers 117A-117H comprise optical gratings that enable coupling of light into and out of the photonically-enabled integrated circuit 130. The grating couplers 117A-117D may be utilized to couple light received from optical fibers into the photonically-enabled integrated circuit 130, and the grating couplers 117E-117H may be utilized to couple light from the photonically-enabled integrated circuit 130 into optical fibers. The grating couplers 117A-117H may comprise single polarization grating couplers (SPGC) and/or polarization splitting grating couplers (PSGC). In instances where a PSGC is utilized, two input, or output, waveguides may be utilized.

The optical fibers may be epoxied, for example, to the CMOS chip, and may be aligned at an angle from normal to the surface of the photonically-enabled integrated circuit 130 to optimize coupling efficiency. In an example embodiment, the optical fibers may comprise single-mode fiber (SMF) and/or polarization-maintaining fiber (PMF).

Figure 1B:
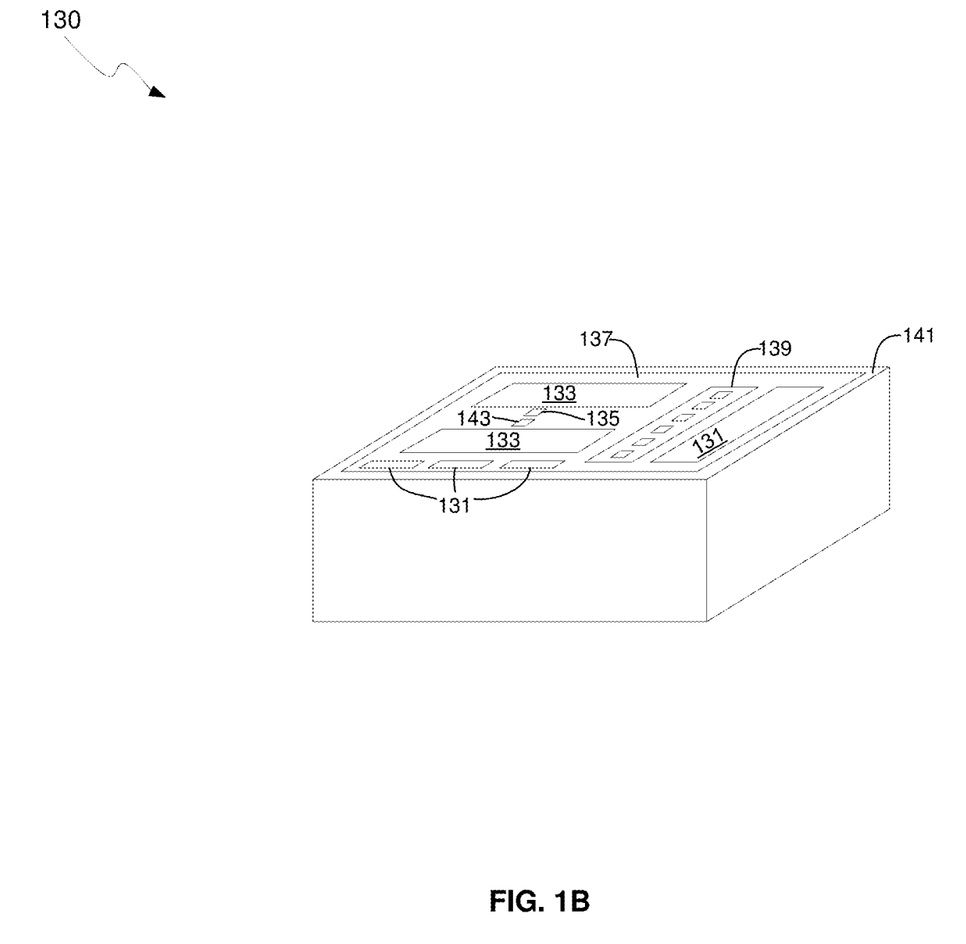
FIG. 1B is a diagram illustrating an exemplary photonically-enabled integrated circuit, in accordance with an example embodiment of the disclosure.

In another example embodiment illustrated in FIG. 1B, optical signals may be communicated directly into the surface of the photonically-enabled integrated circuit 130 without optical fibers by directing a light source on an optical coupling device in the chip, such as the light source interface 135 and/or the optical fiber interface 139. This may be accomplished with directed laser sources and/or optical sources on another chip flip-chip bonded to the photonically-enabled integrated circuit 130.

The directional couplers 103 may receive optical signal in one or more inputs and couple output optical signals to one or more outputs. In this manner, a single optical signal may be split between two output waveguides 110, for example. The photodetectors 111A-111D may convert optical signals received from the grating couplers 117A-117D into electrical signals that are communicated to the amplifiers 107A-107D for processing.

In the receiver subsystem implemented in a silicon chip, light is often coupled into a photodetector via a polarization-splitting grating coupler that supports coupling all polarization states of the fiber mode efficiently. The incoming signal is split by the PSGC into two separate waveguides in a polarization-diversity scheme, and therefore both inputs to the waveguide photodetectors are used. If two different PSGCs are required to couple into the same photodetector, then the PD has have four separate waveguide ports.

The analog and digital control circuits 109 may control gain levels or other parameters in the operation of the amplifiers 107A-107D, which may then communicate electrical signals off the photonically-enabled integrated circuit 130. The control sections 112A-112D comprise electronic circuitry that enable modulation of the CW laser signal received from the couplers 103. The optical modulators 105A-105D may require high-speed electrical signals to modulate the refractive index in respective branches of a Mach-Zehnder interferometer (MZI), for example. In an example embodiment, the control sections 112A-112D may include sink and/or source driver electronics that may enable a bidirectional link utilizing a single laser.

In operation, the photonically-enabled integrated circuit 130 may be operable to transmit and/or receive and process optical signals. Optical signals may be received from optical fibers by the grating couplers 117A-117D and converted to electrical signals by the photodetectors 111A-111D. The electrical signals may be amplified by transimpedance amplifiers in the amplifiers 107A-107D, for example, and subsequently communicated to other electronic circuitry, not shown, in the photonically-enabled integrated circuit 130.

Integrated photonics platforms allow the full functionality of an optical transceiver to be integrated on a single chip. An optical transceiver chip contains optoelectronic circuits that create and process the optical/electrical signals on the transmitter (Tx) and the receiver (Rx) sides, as well as optical interfaces that couple the optical signals to and from a fiber. The signal processing functionality may include modulating the optical carrier, detecting the optical signal, splitting or combining data streams, and multiplexing or demultiplexing data on carriers with different wavelengths, and equalizing signals for reducing and/or eliminating inter-symbol interference (ISI), which may be a common impairment in optical communication systems.

In an example scenario, the photonically-enabled integrated circuit 130 comprises a CMOS photonics die with lasers 101 coupled to the top surface of the IC 130. The lasers 101 may be in one or more laser assemblies comprising a plurality of semiconductor lasers with isolators, lenses, and/or rotators for directing one or more CW optical signals to the couplers 103. In an example scenario, the laser assemblies may be multiple lasers within one laser assembly or may comprise a laser array in a single module, for example, where a pair of lasers is coupled to each optical modulator, with one laser to each arm of the modulator, thereby providing redundant light sources for each transceiver. By coupling redundant lasers to each modulator, yields may be increase, particularly with the difficulty of testing lasers prior to assembly with the CMOS die 130.

In technologies where light sources (e.g. laser diodes) cannot be tested prior to integration with photonic circuits (e.g. silicon photonics) and where the light of that laser is externally modulated by MZI modulators, potential yield fall-out can be mitigated to an extent by using a second redundant source. Therefore, by coupling a laser source to each arm of a modulator, yields may be improved, particularly when the laser yield is already high. When coupled, the system may be tested to verify the operation of the laser sources, and a test procedure may be utilized to determine which laser is to be used for normal operation.

FIG. 1B is a diagram illustrating an exemplary photonically-enabled integrated circuit, in accordance with an example embodiment of the disclosure. Referring to FIG. 1B, there is shown the photonically-enabled integrated circuit 130 comprising electronic devices/circuits 131, optical and optoelectronic devices 133, a light source interface 135, a chip front surface 137, an optical fiber interface 139, CMOS guard ring 141, and a surface-illuminated monitor photodetector 143.

The light source interface 135 and the optical fiber interface 139 comprise grating couplers, for example, that enable coupling of light signals via the CMOS chip surface 137, as opposed to the edges of the chip as with conventional edge-emitting/receiving devices. In addition, the light source interface 135 may comprise contact pads for providing electrical current to lasers in a subsequently coupled assembly with laser sources. Coupling light signals via the chip surface 137 enables the use of the CMOS guard ring 141 which protects the chip mechanically and prevents the entry of contaminants via the chip edge.

The electronic devices/circuits 131 comprise circuitry such as the amplifiers 107A-107D and the analog and digital control circuits 109 described with respect to FIG. 1A, for example. The optical and optoelectronic devices 133 comprise devices such as the couplers 103A-103K, optical terminations 115A-115D, grating couplers 117A-117H, optical modulators 105A-105D, high-speed heterojunction photodetectors 111A-111D, and monitor photodetectors 113A-113I.

Figure 1C:
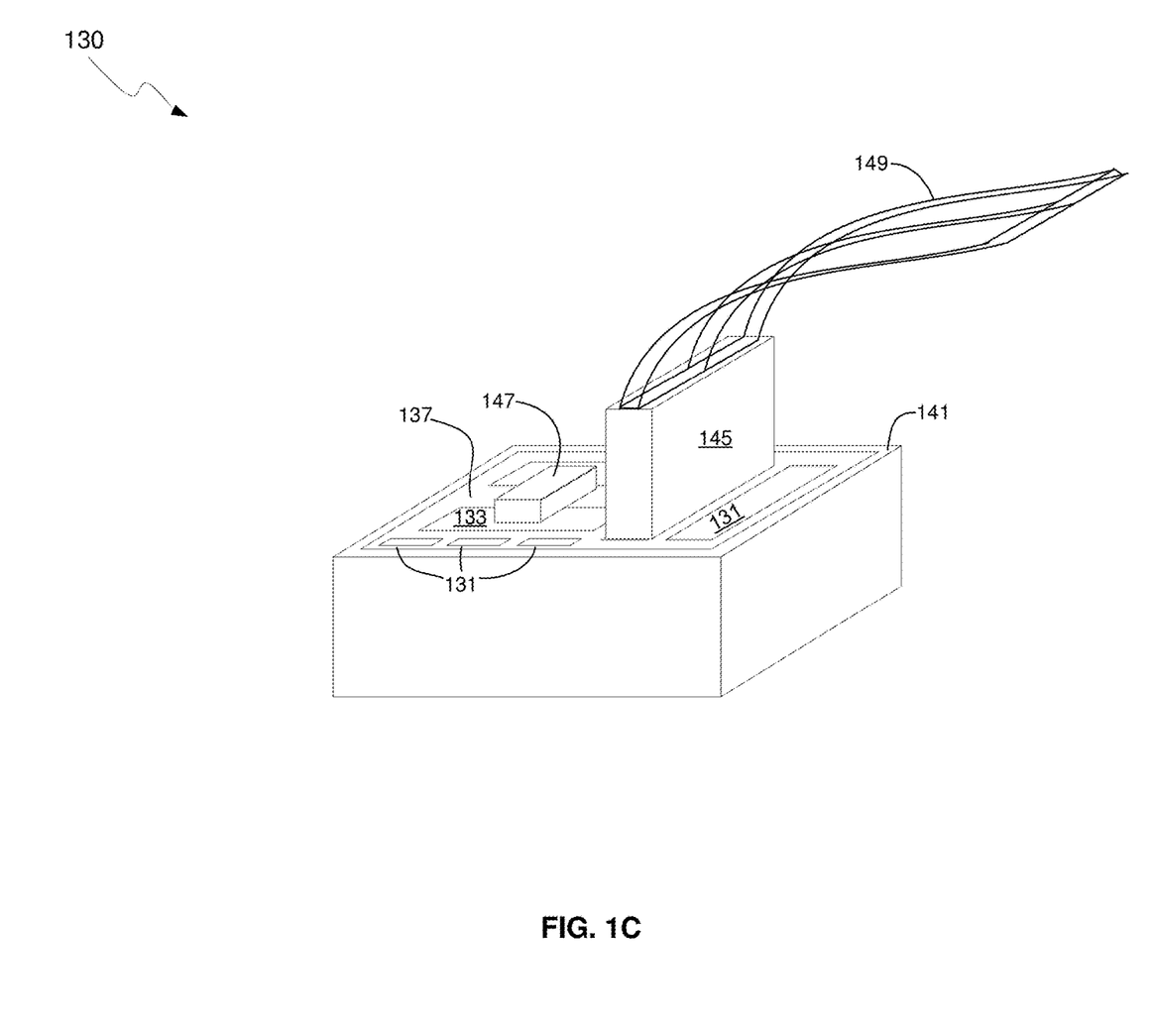
FIG. 1C is a diagram illustrating a photonically-enabled integrated circuit coupled to an optical fiber cable, in accordance with an example embodiment of the disclosure.

FIG. 1C is a diagram illustrating a photonically-enabled integrated circuit coupled to an optical fiber cable, in accordance with an example embodiment of the disclosure. Referring to FIG. 1C, there is shown the photonically-enabled integrated circuit 130 comprising the chip surface 137, and the CMOS guard ring 141. There is also shown a fiber-to-chip coupler 145, an optical fiber cable 149, and an optical source assembly 147.

The photonically-enabled integrated circuit 130 comprises the electronic devices/circuits 131, the optical and optoelectronic devices 133, the light source interface 135, the chip surface 137, and the CMOS guard ring 141 may be as described with respect to FIG. 1B.

In an example embodiment, the optical fiber cable may be affixed, via epoxy for example, to the CMOS chip surface 137. The fiber chip coupler 145 enables the physical coupling of the optical fiber cable 149 to the photonically-enabled integrated circuit 130. In another example scenario, the IC 130 may comprise photonic devices on one die, such as a photonics interposer, and electrical devices on an electronics die, both of which may comprise CMOS die.

The optical source assembly 147 may comprise the lasers 101, as an array or lasers on a single substrate or a plurality of substrates, for example. Each one may be coupled to an input of an MZI, for example, providing redundant optical sources that may increase package yield.

Figure 2:
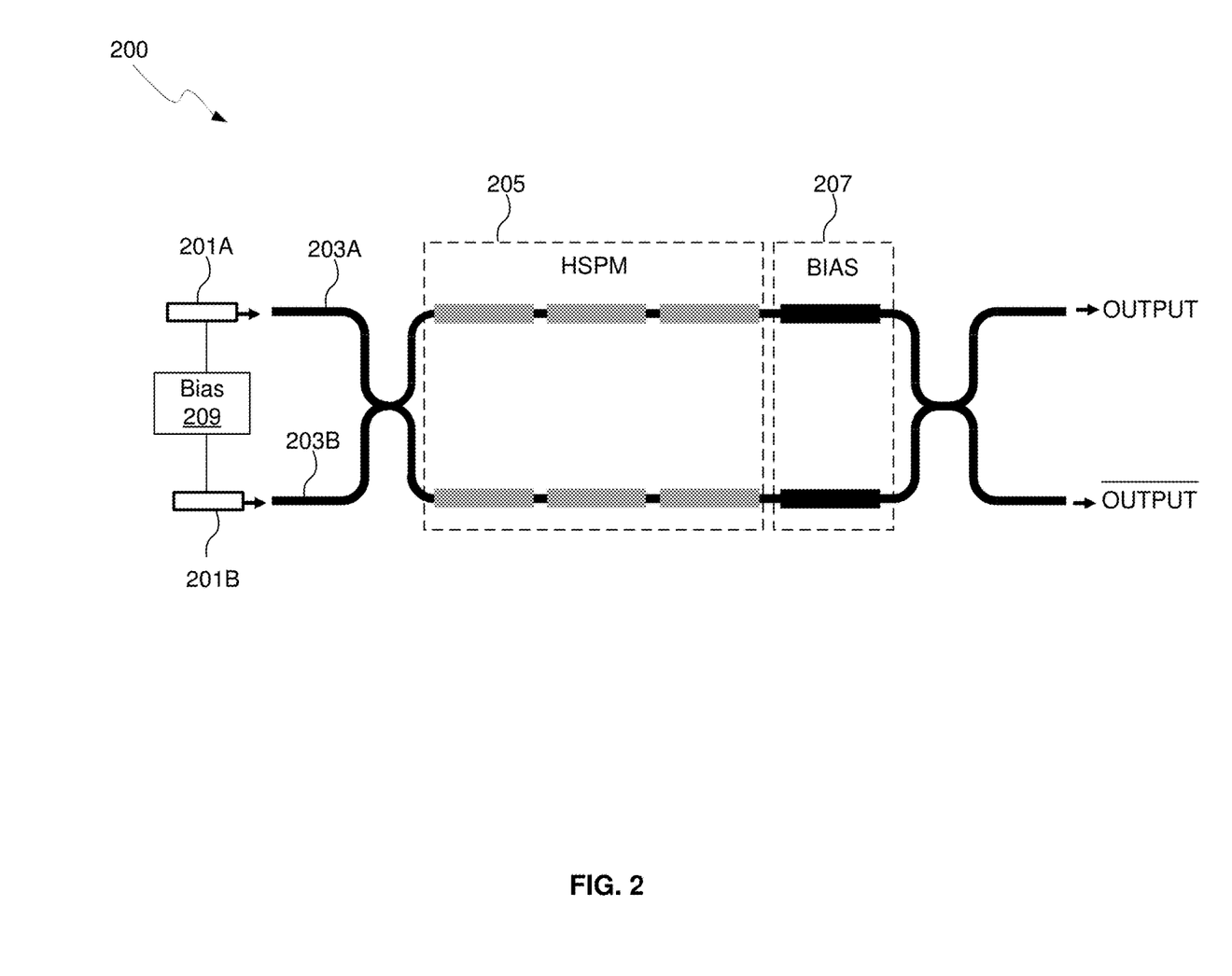
FIG. 2 illustrates an optical modulator with redundant light sources, in accordance with an example embodiment of the disclosure.

FIG. 2 illustrates an optical modulator with redundant light sources, in accordance with an example embodiment of the disclosure. Referring to FIG. 2, there is shown Mach-Zehnder interferometer (MZI) modulator 200 with input waveguides 203A and 203B, high-speed modulator region 205, e.g., reverse-biased diode phase modulation sections, and bias section 207, that compensates low-speed variations, such as temperature, for example. The MZI modulator 200 may share any and all aspects of the optoelectronic transceivers shown in FIGS. 1A-1C, such as controller and biasing circuitry, grating couplers, taps, monitor photodiodes, etc. . . . , for example.

In an example scenario, two lasers 201A and 201B may be coupled to the modulator 200, one for each input branch. The coupling of the lasers 201A and 201B may be as described with respect to FIGS. 1A-1C, with a plurality of lasers in an assembly coupled to a silicon photonics die and light coupled into the die using grating couplers, for example. The lasers 201A and 201B may comprise semiconductor lasers with an emission wavelength tuned to the wavelength of modes in the waveguides 203A and 203B, such as 1.3 or 1.55 µm, for example.

As the lasers 201A and 201B may be mechanically, electrically, and optically coupled to the semiconductor photonics die, there may be many possibilities for device failure. However, by coupling two lasers per modulator, the rate of total failure may be reduced. In instances where one of the lasers fails before or during coupling to the die, the other laser may be utilized. Similarly, if both lasers are functional after bonding to the die, but one fails during operation, the other may subsequently be utilized during operation.

The lasers 201A and 201B may be separately activated and tested for light output, such as through monitor photodetectors, such as monitor photodetectors 113A-113H shown in FIG. 1A that monitor light out of the MZI modulators. Alternatively, monitor photodiodes may be located directly after optical couplers that receive the laser source in the photonics die comprising the MZI 200. The lasers 201A and 201B may receive bias current 209 from the photonics die comprising the MZI modulator 300, or may receive bias current from external to the photonics die.

Figures 3A, 3B:
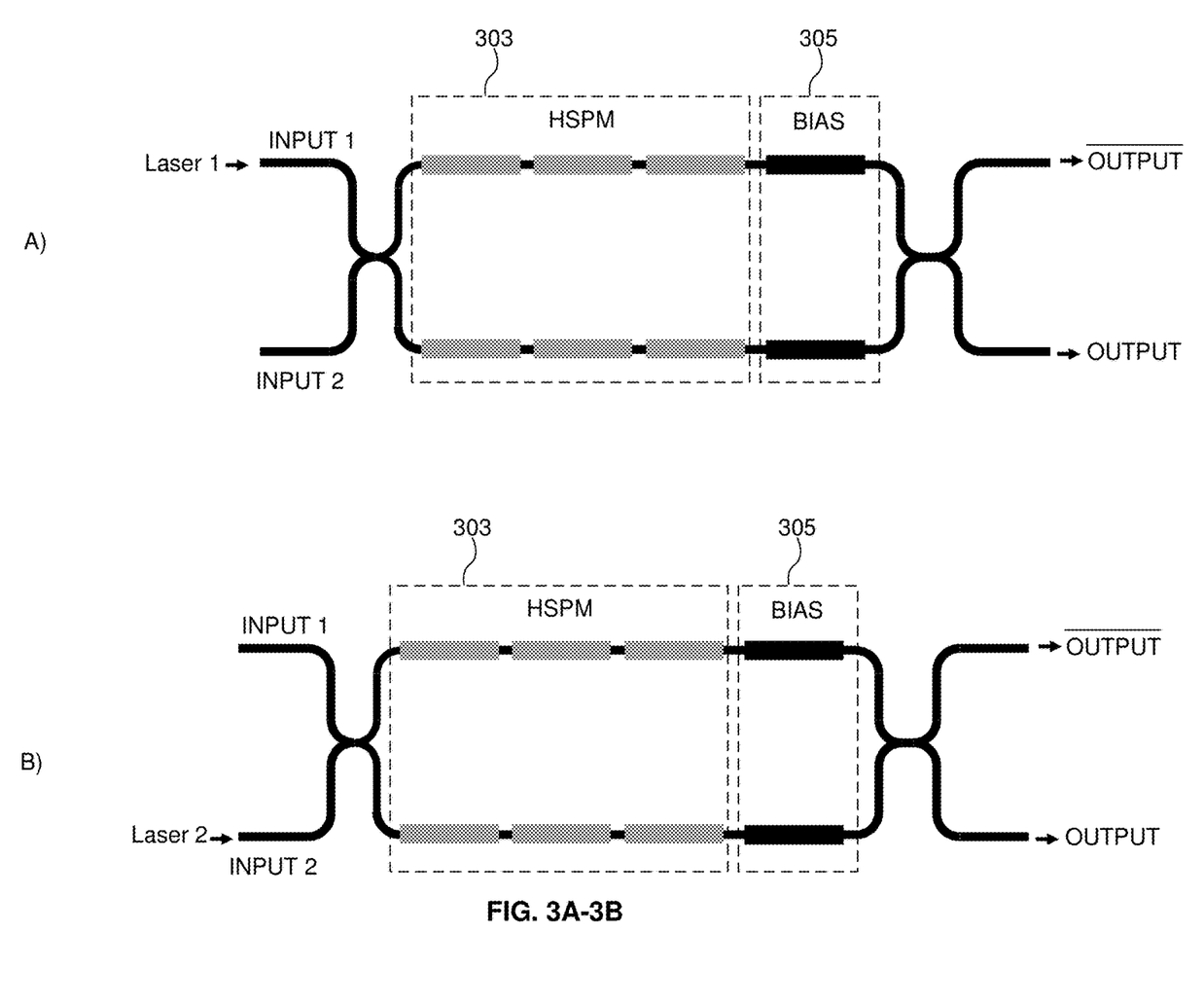
FIGS. 3A-3B illustrate a test procedure for redundant light sources for an optical modulator, in accordance with an example embodiment of the disclosure.

FIGS. 3A-3B illustrate a test procedure for redundant light sources for an optical modulator, in accordance with an example embodiment of the disclosure. Referring to FIG. 3A, there is shown modulator 300 with high-speed modulator region 303, e.g., reverse-biased diode sections, and bias section 305 that compensates low-speed variations, such as temperature, for example. The test procedure may begin with the testing of laser diode 1. If tested OK, internal firmware in the system may be set so that laser diode 1 is selected and INPUT1 of the MZI 300 is used during operation. The selection may determine setting of the MZI bias point so that a specific output port is used.

As shown in FIG. 3B, if laser diode 1 is NOT OK, laser diode 2 may be tested, and if laser diode 2 is OK, internal firmware may be set so that laser diode 2 is selected and INPUT 2 of the MZI 300 is used, which again will determine the setting of the MZI bias point so that a specific output port is used (same as would be used if LD 1 would be selected). If neither laser diode works, the module may be scrapped. The gain in yields from redundant light sources may be most significant when the laser yield is already high as shown in Table 1.

with the MZI modulators described previously, redundant laser sources may be utilized to improve system yields as determined by laser source yield.

In an example embodiment, a method and system are disclosed for redundant light sources by utilizing two inputs of an integrated modulator. In this regard, aspects of the disclosure may comprise In another example embodiment, a method and system are disclosed for redundant light sources by utilizing two inputs of an integrated modulator. In this regard, aspects of the disclosure may comprise an optoelectronic transmitter integrated in a semiconductor die with first and second laser sources coupled to the semiconductor die, said optoelectronic transmitter comprising an optical modulator with a first input waveguide coupled to the first laser source and second input waveguide coupled to the second laser source, the optoelectronic receiver being operable to: configure the first laser source to provide an optical signal to the first input of the optical modulator; and if the first laser source does not provide an optical signal, configure the second laser source to provide an optical signal to the second input of the optical modulator.

The first laser source may be optically coupled to the first input waveguide and the second laser source optically coupled to the second input waveguide using grating couplers. The optical modulator may be a Mach-Zehnder Interferometer (MZI) modulator or a ring modulator. The optoelectronic transmitter may include a plurality of modulators, each with two laser sources. The optoelectronic transmitter may be operable to transmit modulated optical signals from the optoelectronic transmitter using the optical signal from the first laser source or the second laser source. The first and second laser sources may be integrated in an optical source assembly coupled to the semiconductor die. The MZI modulator may include a high speed modulation section and a bias section. The semiconductor die may be a silicon complementary metal oxide semiconductor (CMOS) photonic die While the disclosure has been described with reference to certain embodiments, it will be understood by those skilled

TABLE 1 illustrates the change in transmitter yield with redundant light sources.

| Laser Yield | 0.1 | 0.2 | 0.3 | 0.4 | 0.5 | 0.6 | 0.7 | 0.8 | 0.9 | 1 |
|---|---|---|---|---|---|---|---|---|---|---|
| Tx Yield | 0.190 | 0.360 | 0.510 | 0.640 | 0.750 | 0.840 | 0.910 | 0.960 | 0.990 | 1 |

Figure 4:
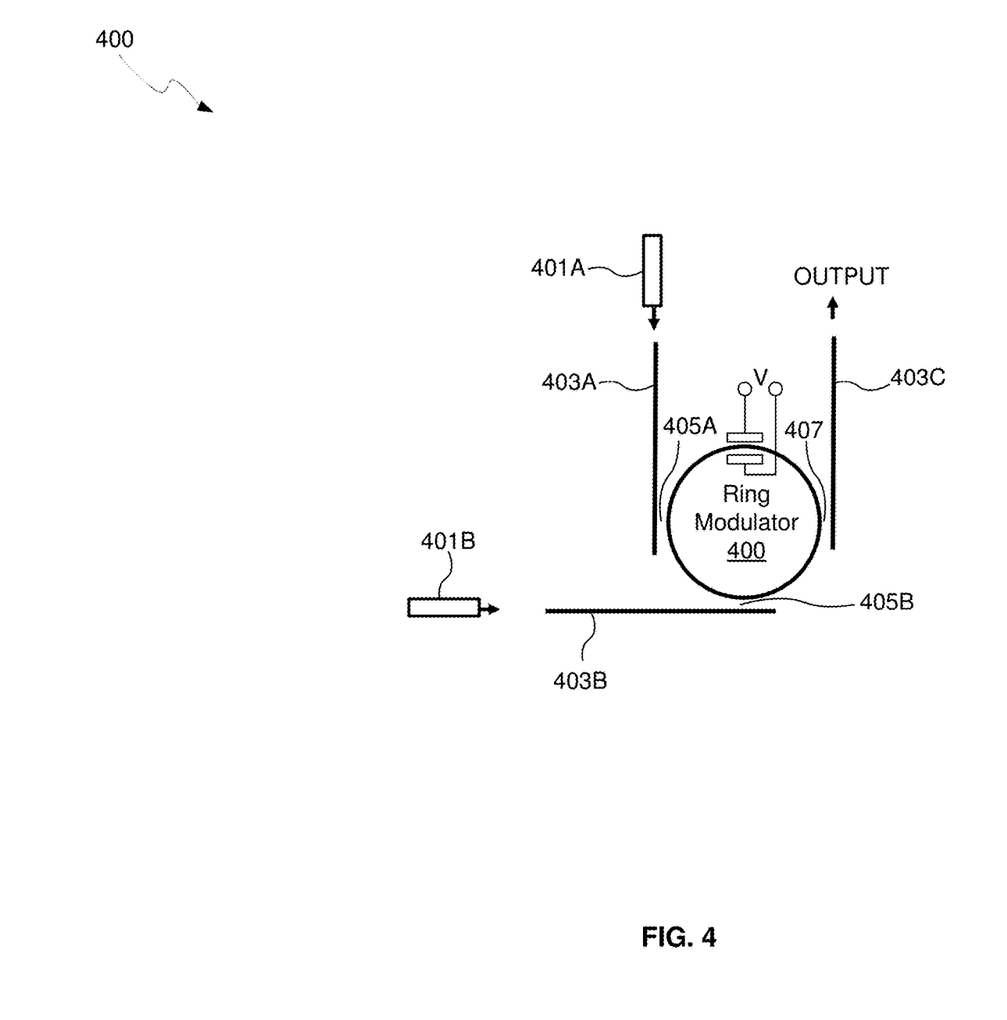
FIG. 4 illustrates redundant light sources for a ring modulator, in accordance with an example embodiment of the disclosure.

FIG. 4 illustrates redundant light sources for a ring modulator, in accordance with an example embodiment of the disclosure. Referring to FIG. 4, there is shown ring modulator 400, comprising a circular waveguide, with source lasers 401A and 401B. A ring modulator exhibits a natural resonant frequency based on its dimensions and materials, where the resonant frequency may be altered by introducing an index change, such as through biasing PN junctions via voltage V, for example, and may thus modulate optical signals introduced via the input waveguides 403A and 403B and modulator inputs 405A and 405B. Light may be coupled into the ring modulator 400 where the input waveguides 403A and 403B come in close proximity, and similarly, light may be coupled out of the ring modulator 400 where the output waveguide 403C comes in close proximity.

The ring modulator 400 may comprise two laser inputs where the input waveguides approach the ring modulator tangentially, coupling the optical signal into the ring. As in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiments disclosed, but that the present disclosure will include all embodiments falling within the scope of the appended claims.

What is claimed is:

1. A method comprising:
   providing power to a first laser source to provide an optical signal to a first input of an optical modulator; and
   upon determining the first laser source does not provide the optical signal, powering a second laser source to provide an optical signal to a second input of the optical modulator.

2. The method according to claim 1, comprising optically coupling the optical signal from the first laser source to the first input and the optical signal from the second laser source to the second input using grating couplers.

3. The method according to claim 1, wherein the optical modulator comprises a Mach-Zehnder Interferometer (MZI) modulator.

4. The method according to claim 1, wherein the optical modulator comprises a ring modulator.

5. The method according to claim 1, wherein the optical modulator is in an optoelectronic transmitter that comprises a plurality of modulators, each with two laser sources.

6. The method according to claim 1, comprising transmitting modulated optical signals from the optical modulator using the optical signal from the first laser source or the second laser source.

7. The method according to claim 1, wherein the first and second laser sources are integrated in an optical source assembly on an optoelectronic transmitter that includes the optical modulator.

8. The method according to claim 1, wherein the optical modulator comprises a high speed modulation section and a bias section.

9. The method according to claim 1, wherein the optical modulator is integrated on one or more semiconductor die.

10. The method according to claim 9, wherein the one or more semiconductor die comprise silicon complementary-metal oxide semiconductor (CMOS) photonics die.

11. An optoelectronic transmitter comprising:
an optical modulator comprising a first input coupled to a first laser source and a second input coupled to a second laser source, the optoelectronic transmitter being operable to:
provide an optical signal from the first laser source to the first input of the optical modulator; and
upon determining the first laser source does not provide the optical signal, power the second laser source to provide an optical signal to the second input of the optical modulator.

12. The optoelectronic transmitter according to claim 11, wherein the first laser source is optically coupled to the first input and the second laser source is optically coupled to the second input using grating couplers.

13. The optoelectronic transmitter according to claim 11, wherein the optical modulator comprises a Mach-Zehnder Interferometer (MZI) modulator.

14. The optoelectronic transmitter according to claim 11, wherein the optical modulator comprises a ring modulator.

15. The optoelectronic transmitter according to claim 11, wherein the optoelectronic transmitter comprises a plurality of modulators, each with two laser sources.

16. The optoelectronic transmitter according to claim 11, wherein the optoelectronic transmitter is operable to transmit modulated optical signals from the optoelectronic transmitter using the optical signal from the first laser source or the second laser source.

17. The optoelectronic transmitter according to claim 11, wherein the first and second laser sources are integrated in an optical source assembly on the optoelectronic transmitter.

18. The optoelectronic transmitter according to claim 11, wherein the optical modulator comprises a high speed modulation section and a bias section.

19. The optoelectronic transmitter according to claim 11, wherein the optoelectronic transmitter is integrated in one or more semiconductor die that comprise silicon complementary metal oxide semiconductor (CMOS) photonic die.

20. An optoelectronic transmitter integrated with first and second laser sources, said optoelectronic transmitter comprising an optical modulator with a first input coupled to the first laser source and a second input coupled to the second laser source, the optoelectronic transmitter being operable to:
bias the first laser source to provide an optical signal to the first input of the optical modulator; and
if the first laser source does not provide the optical signal, bias the second laser source to provide an optical signal to the second input of the optical modulator.

* * * * *